United States Patent
Crescenti Savall et al.

(10) Patent No.: US 10,967,542 B2
(45) Date of Patent: Apr. 6, 2021

(54) PROCEDURE AND SYSTEM FOR MANUFACTURING A PART MADE FROM COMPOSITE MATERIAL AND PART MADE FROM COMPOSITE MATERIAL OBTAINED BY MEANS OF SAID METHOD

(71) Applicant: FUNDACIO EURECAT, Cerdanyola del Valles (ES)

(72) Inventors: Marc Crescenti Savall, Tarragona (ES); Jose Maria Lluis Rodriguez, Tarragona (ES)

(73) Assignee: FUNDACIO EURECAT, Cerdanyola del Valles (ES)

( * ) Notice: Subject to any disclaimer, the term of this patent is extended or adjusted under 35 U.S.C. 154(b) by 280 days.

(21) Appl. No.: 15/534,217

(22) PCT Filed: Dec. 4, 2015

(86) PCT No.: PCT/ES2015/070878
§ 371 (c)(1),
(2) Date: Jun. 8, 2017

(87) PCT Pub. No.: WO2016/092132
PCT Pub. Date: Jun. 16, 2016

(65) Prior Publication Data
US 2017/0361497 A1 Dec. 21, 2017

(30) Foreign Application Priority Data

Dec. 12, 2014 (ES) ................................ ES201431827

(51) Int. Cl.
*B29C 70/20* (2006.01)
*B33Y 10/00* (2015.01)
(Continued)

(52) U.S. Cl.
CPC .......... *B29B 15/122* (2013.01); *B29C 64/118* (2017.08); *B29C 70/20* (2013.01);
(Continued)

(58) Field of Classification Search
CPC ... B29B 15/122; B29B 15/125; B29C 64/118; B29C 70/205; B29C 70/48;
(Continued)

(56) References Cited

U.S. PATENT DOCUMENTS 8,647,102 B2 * 2/2014 Swanson ................. B29C 41/52
425/162
2003/0186042 A1 * 10/2003 Dunlap ................... B29C 39/24
428/304.4
(Continued)

FOREIGN PATENT DOCUMENTS

| EP | 2428353 A1 | 9/2010 |
| EP | 2781342 A1 | 3/2014 |

(Continued)

OTHER PUBLICATIONS https://markforged.com/mark-ONE/; Downloaded Jul. 6, 2017, 8 Pages.

*Primary Examiner* — Jacob T Minskey
*Assistant Examiner* — Caroline Montiel

(57) ABSTRACT

The invention relates to a method for manufacturing a part made from composite material, having a body and one or more continuous fibre bundles in its interior, characterised in that it comprises the stages of: a) obtaining a body that includes one or more tubular cavities in its interior that extend between a first end, disposed on the outer surface of the body and which comprises an inlet orifice, and a second end, opposite to the first end; b) introducing resin in the liquid state and a continuous fibre bundle in the interior of at least one tubular cavity through its inlet orifice; and c)

(Continued)

curing the resin until it solidifies, adhering to the body and fixing the continuous fibre bundle. The invention also relates to a system for manufacturing a part made from composite material and to the part made from composite material obtained.

19 Claims, 9 Drawing Sheets

(51) Int. Cl.
  *B29C 64/118* (2017.01)
  *B29K 105/08* (2006.01)
  *B29B 15/12* (2006.01)
  *B29C 70/74* (2006.01)
  *B29C 70/48* (2006.01)
  *B33Y 30/00* (2015.01)
  *B33Y 80/00* (2015.01)
  *B29K 63/00* (2006.01)
  *B29K 67/00* (2006.01)
  *B29K 309/08* (2006.01)

(52) U.S. Cl.
  CPC ............ *B29C 70/205* (2013.01); *B29C 70/48* (2013.01); *B29C 70/745* (2013.01); *B33Y 10/00* (2014.12); *B33Y 30/00* (2014.12); *B33Y 80/00* (2014.12); *B29B 15/125* (2013.01); *B29K 2063/00* (2013.01); *B29K 2067/046* (2013.01); *B29K 2105/08* (2013.01); *B29K 2309/08* (2013.01)

(58) Field of Classification Search
  CPC ... B29C 70/745; B29C 70/20; B29K 2105/08; B29K 2309/08; B29K 2067/046; B29K 2063/00; B33Y 80/00; B33Y 30/00; B33Y 10/00
  See application file for complete search history.

(56) References Cited

U.S. PATENT DOCUMENTS

2014/0291886 A1* 10/2014 Mark .................... B29C 70/384
    264/163
2016/0176109 A1* 6/2016 Farmer ................ B29C 64/106
    264/171.1

FOREIGN PATENT DOCUMENTS

| EP | 2781342 B1 * | 5/2016 | ............ B05D 3/002 |
|---|---|---|---|
| WO | 92/16347 | 10/1992 | |
| WO | WO-9216347 A1 * | 10/1992 | ............ B29C 70/50 |

* cited by examiner

PROCEDURE AND SYSTEM FOR MANUFACTURING A PART MADE FROM COMPOSITE MATERIAL AND PART MADE FROM COMPOSITE MATERIAL OBTAINED BY MEANS OF SAID METHOD

The present relates to a method for manufacturing a part made from composite material with which it is possible to obtain parts with complex geometric shapes and with enhanced features. In addition, the method of the present invention makes it possible to easily combine different kinds of materials, enabling the production of parts from a wide variety of composite materials. The present invention also relates to a system for manufacturing a part made from composite material and to a part made from composite material obtained by means of said method.

BACKGROUND OF THE INVENTION

Composite materials, or composites, are widely used in multiple industries, such as the aerospace, automotive, energy or construction industry, inter alia. A composite material is a material formed from various materials which have been specially selected and configured to combine their properties, thereby obtaining a new material, composite, with enhanced mechanical, thermal and/or chemical features. Thus, for example, composite materials can be designed such as to have greater mechanical resistance, greater resistance to corrosion, better dimensional stability, greater impact-absorbing capacity and/or lighter.

Typically, a composite material is constituted by a matrix and a reinforcement, in the form of particles or fibres, arranged within the matrix. The composite materials of a carbon fibre-reinforced polymer matrix, for example, are known.

Reinforcement fibres can be classified as continuous or discontinuous fibres. Discontinuous fibres, in turn, are classified as short fibres (with typical lengths of 2-10 mm) and long fibres (with typical lengths of 10-50 mm, or even greater, for example 100 mm or 150 mm). Furthermore, continuous fibres usually come in coils with a total length of tens or hundreds of metres, or even kilometres. In addition, in the case of continuous-fibre composite materials, usually the fibres have a predefined orientation, while in the case of discontinuous-fibre materials they generally have a random orientation.

Despite the fact that they are normally cheaper, composite materials reinforced with particles and discontinuous fibres tend to be weaker and less rigid than continuous fibres composite materials, the latter being considered as high-performance composite materials.

Technologies for manufacturing parts made from composite materials with continuous fibres based on stacking of fibre layers arranged parallel or intertwined in the form of a fabric are known. The parts obtained using these technologies are essentially flat plates or plates having a certain curvature. In some cases, such as for example in resin transfer moulding (RTM) and other techniques based on resin infusion, dry fibre layers are firstly stacked on a mould with the shape of the part to be manufactured and are then impregnated with liquid resin by applying pressure or a vacuum, which will subsequently be cured under certain temperature conditions. Alternatively, in other cases, such as for example in the moulding of fibre laminates pre-impregnated with resin (or prepregs), fibre laminates pre-impregnated with resin in a quasi-solid state are arranged on the mould of the part to be manufactured, in order to subsequently proceed to cure them, normally in an autoclave.

Another technology for manufacturing parts made from composite material is filament winding, with which hollow tubular-shaped parts of hollow circular or oval cross-section can be obtained. This technology consists of winding on a mandrel continuous fibres which have been previously submerged in a resin bath or directly prepregs.

Also known is profile pultrusion, wherein a continuous fibre bundle is stretched so as to firstly pass through a resin bath and then through a mould having a constant cross-section along part of its length, with which the extruded profile is shaped, and wherein the material is also cured, generally applying temperature to the mould itself.

The manufacturing methods based on these technologies impose serious limitations on the geometries of the parts obtained, which are generally simple shapes such as plates and surfaces (flat or having a certain curvature), hollow tubular structures and extruded profiles having a constant cross-section. For this reason, it is usually necessary to include an additional stage in the manufacturing method for joining, mechanically or by adhesion, various parts made from composite materials to obtain a desired geometry, in addition to machining these parts. This slows down the manufacturing method and raises its cost, in addition to generate a lot of waste composite material.

Another limitation of the manufacturing methods of parts made from composite material of the state of the art is that the continuous fibres are confined to the laminate plane, not being possible to orient them freely in the three dimensions of the part. On not having reinforcement fibres oriented in the stacking direction (direction perpendicular to the surface of the layers) that join the different laminate layers therebetween, the union between the stacked layers is critical. For this reason, the parts obtained by means of these manufacturing methods have low resistance to interlayer delamination.

Additionally, the known manufacturing methods are not appropriate for obtaining composite materials wherein continuous-fibre reinforcement must be combined with a non-polymer matrix, such as for example ceramic or metallic.

Also known are additive manufacturing technologies, or 3D printing, wherein a three-dimensional object of arbitrary geometry is manufactured by means of overlapping successive material layers. In each layer, material is added point by point, until manufacturing the 3D geometry previously defined using 3D design tools, such as for example Solidworks (CAD 3D) or Blender (3D modelling).

Additive manufacturing technologies can be classified in three large groups, in accordance with the format of the filler material.

Technologies based on solid material, such as for example fused deposition modelling (FDM), wherein the positions in which to deposit a molten plastic or metallic thread that will subsequently solidify before depositing the following layer are determined layer by layer by means of numerical control. The process is repeated layer by layer until generating the full geometry.

Technologies based on powdered material, such as Selective Laser Sintering (SLS), Selective Laser Melting (SLM) or Electron Beam Melting (EBM), wherein the powdered material is deposited layer by layer and melted or sintered selectively and with which it is possible to obtain parts made from plastic, metallic, ceramic or semi-crystalline material.

Technologies based on liquid material, such as for example stereolithography (SLA), Direct Light Processing (DLP) or PolyJet Modelling, wherein photosensitive resins are cured by means of light and with which polymer resin parts can be manufactured.

Due to being based on adding material rather than removing it as in most manufacturing processes, additive manufacturing technologies enable the manufacture of highly complex geometries, impossible to obtain by means of other technologies, and even mechanisms that comprise a set of pre-assembled parts, producing very little wastage of material. These technologies also enable manufacturing parts of different materials, such as for example metals, ceramic materials, thermoplastic polymers and/or thermostable polymers.

Furthermore, both the method disclosed in patent application EP2781342A1 and the "Mark One©" machine by MarkForged, Inc. (https://markforged.com/mark-one/) enable the obtainment of continuous fibre-reinforced parts by means of additive manufacturing, but with the limitations that the reinforcement can only be disposed layer by layer and work only with thermoplastics.

It would therefore be desirable to have a method and a system for manufacturing a part made from composite material capable of producing parts with complex geometries and with enhanced features, which also allows the use of a wide variety of composite materials and the arrangement of the reinforcement fibres in every direction. It would also be desirable to have a part made from composite material obtained by means of said method having enhanced features.

DESCRIPTION OF THE INVENTION

With the method for manufacturing a part made from composite material as described, the system for manufacturing a part made from composite material as described and the part made from composite material obtained by means of the described method, the aforementioned drawbacks are solved, presenting additional advantages that will be described. Other advantageous embodiments of the invention are defined in the independent claims.

A first aspect of the present invention relates to a method for manufacturing a part made from composite material, wherein the part comprises a body and one or more continuous fibre bundles arranged within said body.

Said method is characterised in that it comprises the stages of:

a) obtaining a body that includes one or more tubular cavities in its interior, wherein each tubular cavity of said one or more tubular cavities extends between a first end, disposed on the external surface of the body and which comprises an inlet orifice, and a second end, disposed opposite to said first end;

b) introducing resin in the liquid state and a continuous fibre bundle in the interior of at least one tubular cavity of said one or more tubular cavities through its inlet orifice, such that the input end of the continuous fibre bundle advances towards the second end of said at least one tubular cavity; and c) curing the resin until it solidifies, adhering to the body of the part and fixing the continuous fibre bundle in the interior of said at least one tubular cavity.

As opposed to the known manufacturing methods, in the method of the present invention the body of the part (which would be equivalent to the matrix in the methods described in the state of the art) is firstly obtained in stage a), to then proceed to reinforce said body introducing one or more continuous bundle fibres in the interior of respective tubular cavities created in the body of the part in stage b).

On separating, on the one hand, the obtainment of the body of the part and, on the other, the reinforcement of the part with continuous fibre bundles, the manufacture of said body is not limited to the conventional composite material manufacturing technologies, based for example on the stacking of layers or profile pultrusion, therefore enabling the production of a body having a more complex geometry than using conventional manufacturing technologies.

In the same manner, the arrangement of the continuous fibre bundles inside the body is not determined by the stacking of the fibre bundle layers, whether dry or pre-impregnated, but rather by the path of the tubular cavities contained in the interior of the body of the part.

Said method becomes particularly interesting when the body is obtained by means of additive manufacturing technologies, as said technologies enable the obtainment of bodies having tubular cavities in their interior following arbitrarily complex paths, impossible to obtain by means of other manufacturing technologies, such as for example machining of parts or injection of plastics.

Therefore, the method of the present invention enables the obtainment of parts made from composite material with enhanced features, given that the paths of the continuous fibre bundles contained in the interior of the body of the part can be optimised in accordance with the design specifications. Thus, for example, the paths of the tubular cavities may be adjusted to coincide with the paths in the interior of the body of the part along which the main stresses are transmitted.

Additionally, given that the part is reinforced by means of the insertion of continuous fibre bundles in tubular cavities previously created in the body of said part, the method of the invention enables the manufacture of reinforced parts made from a wide variety of composite materials, wherein the continuous fibres of the bundles can be made from a first material and the body from a second material different from the first one. Thus, for example, a part having a body made from carbon fibre-reinforced ceramic or metallic material can be easily produced.

In a preferred embodiment, the body of the part is made from plastic material, ceramic material, metallic material (such as, for example, aluminium, titanium, copper or steel) or a combination thereof. Moreover, in some embodiments, the body itself may be made from a composite material, such as for example a fibre-reinforced polymer matrix.

In accordance with an embodiment, stage b) comprises carrying out said introduction of resin in the liquid state and of the continuous fibre bundle simultaneously. In this embodiment, the resin advantageously has two main functions: on the one hand, in stage b), it contributes to introduce the continuous fibre bundles in the interior of the tubular cavities; and, on the other, once cured and solidified at the end of stage c), it acts as a bond interface between the continuous fibres of the bundles and the body of the part.

For an alternative embodiment, stage b) comprises carrying out the aforementioned introduction sequentially, first for the continuous fibre bundle and then the resin in the liquid state, wherein in this case the resin only fulfils one of the two main functions mentioned in the preceding paragraph, particularly that of acting as a bonding interface between the continuous fibre bundles and body of the part.

For a variant of said alternative embodiment, the method of the first aspect of the invention comprises carrying out the introduction of the continuous fibre bundle in the interior of at least the aforementioned tubular cavity, exerting a dragging force by means of a pressurised fluid along the interior of at least said tubular cavity and/or exerting a mechanical pushing force (for example by means of a system for clamping and dragging, by displacement, the continuous fibre bundle or by means of a roller system coupled to the continuous fibre bundle).

In a preferred implementation of said alternative embodiment, the fibres are firstly introduced using a gas, such as air, nitrogen or other gas. Said gas, on having much less viscosity than resin, can travel at much greater speed than the latter and in a turbulent regime, which at times contributes to better drag the fibre bundle along the interior of the tubular cavity.

The resin may be a thermostable resin or a thermoplastic resin. Thermoplastic resins, such as polypropylene (PP), polyamide (PA), polyethylene (PE), styrene butadiene acrylonitrile (SBA) or polylactic acid (PLA), are characterised in that, at ambient temperature, they are in the solid state and melt above a certain temperature, which makes it possible to shape them by means of processes such as injection or extrusion.

Alternatively, thermostable resins, such as for example epoxy, polyester, vinylester or phenolic, are characterised in that, at ambient temperature, they are in the liquid state and solidify by means of a curing process. As opposed to thermoplastic resins, they usually become degraded or burn as of a certain temperature. Also, in the liquid state, they offer much lower viscosities than thermoplastic resins, which allows better impregnation of the fibres and advantageously facilitates their introduction together with the continuous fibre bundles inside the tubular cavities.

The curing of the resin in stage c) can be advantageously performed by means of the application of heat, light, electromagnetic waves or a combination thereof.

In some embodiments, after stage b) all the tubular cavities of the body contain a continuous fibre bundle in their interior. However, in other embodiments, on concluding stage b) there is at least one tubular cavity of the body wherein a continuous fibre bundle has not been introduced in its interior. In these embodiments, the tubular cavity that remains free can advantageously form part of a cooling circuit for cooling the body of the part, making a cooling fluid pass through the interior of said cavity.

Further, in some embodiments, in stage b) the continuous fibre bundle is introduced in the tubular cavity until its input end reaches the second end of the tubular cavity, while in other embodiments the continuous fibre bundle does not reach said second end.

The tubular cavities may be blind or through cavities. In a blind tubular cavity, the second end of the cavity is in the interior of the body. However, in a through tubular cavity the second end of the tubular cavity is disposed on the external surface of the body and comprises an outlet orifice.

In some embodiments, all the tubular cavities of the body of the part obtained in stage a) are through cavities, while in other embodiments all the tubular cavities are blind. Lastly, in other embodiments, the body comprises at least one through tubular cavity and at least one blind tubular cavity.

The cross-section of the tubular cavities of the body may be circular, oval or polygonal. In some cases, the cross-section of a tubular cavity will be constant therethrough from its first end to its second end, while in other embodiments the cross-section may vary as the tubular cavity becomes separated from the first end.

In the context of the first invention, the term tubular cavity preferably relates to a cavity wherein its length, defined by the distance between its first end and its second end, is at least 10, 20, 30 or even 50 times greater than the diameter of the cross-section of said cavity. In the event that the cross-section of the cavity is not constant, said diameter preferably relates to the average value of the diameter of the cross-section of the tubular cavity therethrough from its first end to its second end.

In stage b), as the resin is introduced in the interior of said at least one tubular cavity, the air contained in the interior of said tubular cavity is expelled mainly through its outlet orifice, if any, i.e. for a through tubular cavity, or for a blind tubular cavity, through the porosity of the material of the body and/or of a small outlet orifice for facilitating the outflow of air at the end of the blind tubular cavity, or of various orifices throughout the blind tubular cavity, for example 0.5 mm in diameter.

The continuous fibre bundle or bundles of the part comprise a plurality of fibres (at times also referred to as filaments) which may be disposed braided forming a thread or loose and unbraided. Preferably, a continuous fibre bundle comprises at least one thousand fibres. Also preferably, said fibres have a diameter between 5 and 25 microns.

In some embodiments, the fibres of said fibre bundle or fibre bundles are carbon fibres, glass fibres or aramid fibres. Carbon fibres are particularly advantageous when high mechanical features are required, while glass fibres offer a good compromise between features and cost. Aramid fibres are particularly appropriate when the part to be reinforced must have great impact-absorbing capacity.

In other embodiments, the fibres of said fibre bundle or fibre bundles are flax, hemp or bamboo fibres. The use of fibres of natural origin is preferable in those applications wherein less environmental impact is desired.

In other embodiments, the fibres of said fibre bundle or fibre bundles are metallic, such as for example steel or copper fibres. The use of metallic fibres is preferable in those applications where greater thermal or electrical conductivity is desired.

In other embodiments, the fibres of said fibre bundle or fibre bundles comprise a combination of the aforementioned types of fibres. In this manner, combined properties can be obtained, such as for example good mechanical resistance and electrical conductivity at the same time.

Optionally, a continuous fibre bundle of said fibre bundle or fibre bundles comprises at least one optical fibre. This enables the transmission of light and/or signals throughout the tubular cavity. In particular, the optical fibre can form part of a mechanical stress o deformation sensor, or for monitoring other mechanical properties of the part.

In a preferred embodiment, in stage b) positive pressure is exerted on the resin in the inlet orifice of a tubular cavity of said at least one tubular cavity, such that the resin introduced in said tubular cavity is impelled towards the second end of said tubular cavity. The viscosity of the resin makes it drag the continuous fibre bundle throughout the tubular cavity towards said second end without being necessary to mechanically act upon the continuous fibre bundle. This guarantees a correct impregnation of the bundle fibres with the resin throughout the length thereof, whereupon the fibres adhere optimally to the body of the part once the resin cures. It has also been verified that on occasions the resin and the fibres travel at similar speeds, both reaching the end of the tubular cavity almost at the same time. This ensures minimum wastage of fibre and resin.

In another preferred embodiment, the second end of a tubular cavity of said at least one tubular cavity is disposed on the outer surface of the body and comprises an outlet orifice. Also, in said embodiment, in stage b) vacuum is applied in the outlet cavity of said tubular cavity, such that the resin introduced in said tubular cavity is suctioned towards its outlet orifice. In this alternative manner, the resin also drags the continuous fibre bundle towards said second end.

Optionally in this preferred embodiment, in addition to applying a vacuum in the outlet orifice of said at least one tubular cavity, in stage b) a positive pressure is also exerted on the resin in the inlet orifice of said tubular cavity.

The combination of overpressure in the inlet orifice and underpressure in the outlet orifice of a same tubular cavity allows the resin and the continuous fibre bundle to advance faster through the interior of the tubular cavity than if it only acts on one of the two ends thereof, thereby reducing the time required for stage b). Alternatively, the combination of overpressure and underpressure makes it possible to achieve the same insertion speed of the resin and of the continuous fibre bundle with lower pressure values than if it only acts on one of the ends of the tubular cavity.

In some embodiments, additionally or alternatively, in a tubular cavity of said at least one tubular cavity, in stage b) a mechanical pushing force is exerted on the continuous fibre bundle inserted in said tubular cavity, such that the continuous fibre bundle is pushed towards the second end of the said tubular cavity. In this way, a certain speed of insertion of the continuous fibre bundle in the tubular cavity can be maintained under less demanding positive pressure and/or vacuum conditions, as well as achieving the insertion of the fibres in tubular cavities with more complex curvatures.

Said mechanical pushing force may be exerted, for example, by means of a roller system coupled to the continuous fibre bundle or by means of a system for clamping and dragging, by displacement, the continuous fibre bundle.

In terms of productivity, of impregnation of the fibres with resin throughout the tubular cavity, of amount of fibres inserted, of generation of waste and of insertion capacity of fibres in tubular cavities having complex paths, the three most efficient options that the present inventors have detected are the following:

1. Inserting the continuous fibre bundle and resin simultaneously applying a pressure differential.
2. Firstly inserting the continuous fibre bundle using a gas flow and then insert the resin applying a pressure differential.
3. Option 1 or 2, adding the application of a mechanical pushing force to the continuous fibre bundle.

Less efficient options, but also envisaged in the method of the first aspect of the invention, are the following:

4. Only applying a mechanical pushing force to the continuous fibre bundle and then inserting the resin. This option may work for simple, slightly rough tubular cavities and for short insertion distances.
5. Combining option 1, 2, 3 or 4 pulling the fibres by means of a thread introduced from an outlet orifice of the tubular cavity. This option implies acting from the outlet orifice, due to which it is not very productive.

Also additionally or alternatively, in a tubular cavity of said at least one tubular cavity, in stage b) a mechanical torsion force is exerted on the continuous fibre bundle inserted in said tubular cavity. Said torsion of the continuous fibre bundle can be achieved rotating the continuous fibre bundle or, alternatively, the body of the part.

Optionally, after stage c) the method comprises the additional stages of:

cutting off any excess from the continuous fibre bundle and/or resin that projects from the inlet orifice of said at least one tubular cavity; and/or polishing and/or lowering the outer surface of the body.

This will give the part the final finish, improving its appearance. In certain cases, the body of the part may have been oversized on purpose so that, on trimming down its outer surface (for example, by means of machining), any excess is cut off from the continuous fibres and/or resin.

Preferably, prior to stage c) the method comprises a stage of conditioning the body of the part at resin curing temperature. More preferably, the stage of conditioning the body of the part is carried out between stage a) and stage b). This speeds up the resin curing process, reducing processing time and increasing the productivity of the manufacturing method.

Optionally, during stage c) the method comprises a stage of applying a mechanical force to the body of the part. In this way, once the resin is cured, the body will be pre-tensed, thereby improving the behaviour of the reinforced part under different load conditions.

Preferably, stage a) uses additive manufacturing technology. These technologies advantageously enable the production of parts having arbitrary geometry that include tubular cavities with complex paths in their interior.

In these embodiments, preferably before stage a), the method comprises the stages of:

creating a three-dimensional model of the body of the part to be manufactured using CAD or 3D modelling tools; and determining, based on said three-dimensional model, the path of each tubular cavity of said one or more tubular cavities.

Using 3D design and finite element simulation tools, the geometry of the body of the part can be optimised (for example, by means of a topology optimisation algorithm) in accordance with, for example, the mechanical loads to be borne by the part. Once said model is available it will then be possible to determine, design or even calculate, by means of an optimization algorithm, the path of the tubular cavities in accordance with the specifications that the part reinforced with continuous fibres must fulfil.

In certain embodiments, the body of the part comprises a plurality of elements, each element having at least one tubular cavity segment in its interior. In these embodiments, stage a) comprises the substage of joining the plurality of elements therebetween, interconnecting the tubular cavity segments such as to form said one or more tubular cavities. On being the body of the part formed by various elements that are joined therebetween, it is possible to obtain parts or structures with greater dimensions, with the fact that the fibres go from one element to another being key, giving continuity to the part and generating integrated, high-performance bonds.

Optionally, in these embodiments, stage a) additionally comprises the substage of curving and/or shaping at least one element of said plurality of elements before or after joining them together. In this way, geometrically complex bodies can be obtained from geometrically simple elements such as, for example, flexible extruded tubes.

Also optionally, stage a) comprises the substage of obtaining by means of extrusion, injection, machining and/or pultrusion each element of said plurality of elements or the entire body when it is formed by a single element. These manufacturing technologies, despite not offering as many possibilities at geometric level as additive manufacturing technologies, have other advantages such as, for example, higher productivity.

In other embodiments, stage a) comprises the substages of producing a solid body and, subsequently, machining said one or more tubular cavities in said body.

In general, before stage b) the method comprises the additional stages of:
  applying a bath of liquid resin to the continuous fibre bundle; and
  confronting the input end of the continuous fibre bundle impregnated in resin with the inlet orifice of said at least one tubular cavity.

In general, the method comprises, after having inserted the fibre bundle in a cavity, cut it and confronted the input end of the continuous fibre bundle with the inlet orifice of the other cavity, repeating these actions for all the tubular cavities wherein continuous fibre bundles must be inserted.

Optionally, prior to stage b) the method comprises the stage of coupling a joining element for joining together the ends of the fibres or filaments that constitute the continuous fibre bundle to the input end of said bundle. Said joining element prevents the ends of the fibres or filaments from becoming separated as the input end advances along the interior of the tubular cavity due to the roughness of its walls, thereby preventing the continuous fibre bundle from get stuck inside the tubular cavity.

As regards said joining element, it may be any element considered appropriate by a person skilled in the art, the following types of joining elements being particularly appropriate: tied ultrafine thread, ultrafine elastic band and that constituted on preimpregnating the end of the bundle with elastic resin, latex or silicone.

Also, advantageously, the end of the bundle is cut obliquely so as to have pointed shape, thereby facilitating its forward travel along the interior of the tubular cavity.

Preferably, the joining element has a geometry adapted to fit tightly in the interior of the cross-section of the tubular cavity wherein the continuous fibre bundle having said element will be introduced. In this way, the joining element offers a larger surface to the resin that is introduced in the tubular cavity, increasing the dragging force of the resin over the continuous fibre bundle towards the second end of the tubular cavity.

In accordance with another embodiment, the method of the first aspect of the invention comprises cutting the fibre bundle to a measurement similar to the length of the tubular cavity before the insertion process, in such a manner that, rather than use a fibre coil, a set of fibre bundle segments is used, which will be inserted in the different tubular cavities of the body. This may be necessary in the event that it is wanted to impregnate the point of the bundle and cut it obliquely to facilitate input.

For one embodiment, the method comprises a stage of emptying the powder from inside the tubular cavity before inserting the continuous fibre bundle and the resin. This embodiment is particularly applicable when the manufacture of the body has been carried out using additive manufacture technologies that work based on powdered material.

Optionally, the method of the first aspect of the invention also comprises a stage of applying a treatment in the interior of the tubular cavity to reduce its roughness before introducing the fibres.

A second aspect of the present invention relates to a part made from composite material, characterised in that it comprises a body and at least one continuous fibre bundle arranged within said body; wherein the lateral surface of said at least one continuous fibre bundle has a resin coating; and wherein the part made from composite material is obtained by means of the method according to the first aspect of the present invention.

In accordance with an embodiment of the part of the second aspect of the invention, the resin that covers the fibre bundle is made from a material other than the material or materials of the body.

For another embodiment, the resin that covers the fibre bundle is made from the same material as that of the body. This may occur when the body is obtained by means of SLA or DLP additive manufacturing technologies that use photosensitive resins. In this case, the resin inserted subsequently in the tubular cavities may be the same photosensitive resin and be subsequently cured through the application of light.

For another additional embodiment, the materials are very similar although with some different intrinsic properties, particularly as regards the type of curing they require. Such is the case wherein the body is made from photosensitive resin (light-cured) and the coating is made of conventional resin (temperature-cured). On cutting the part, the two resins can be visually differentiated (different shades, different transparency). Some of the differences therebetween can unequivocally be identified using laboratory equipment.

In accordance with one embodiment, the fibre bundles have at least one of their ends disposed on the outer surface of the body or slightly below it. The latter can occur when the part has received a coat, for example of paint, subsequent to the manufacturing method.

The resin that coats the lateral surface of the bundle or of each of the bundles, of continuous fibres defines an interface between said bundle or bundles and the body of the part, adhering to both. Therefore, it is possible to manufacture reinforced parts made from a wide variety of composite materials.

Preferably, said body comprises a plurality of layers, said layers being disposed stacked in a direction perpendicular to the surface thereof; and a continuous fibre bundle of said at least one bundle is contained in two or more layers of said plurality of layers.

On being one or more continuous fibre bundles disposed on two or more layers of the plurality of layers that form the body of the part, the part made from composite material is also reinforced in the stacking direction of the layers, having high resistance to interlayer delamination. The higher the number of continuous fibres disposed on more than one layer of the body and the higher the number of layers penetrate the continuous fibre bundles, the greater the resistance of the part to delamination.

The method according to the first aspect of the invention enables the continuous fibre bundles of the body of the part not to be confined within a single layer. In this regard, both the body of the part and the tubular cavities that the finished body includes in its interior can be obtained as a superposition of layers, wherein the path of each tubular cavity has been designed arbitrarily so as to have a component in the stacking direction of the layers. Thus, on introducing the continuous fibre bundles in the interior of said cavities, these would be disposed on two or more layers of the body, reinforcing the part not only in a direction parallel to the surface of the layers, but also in an oblique direction, such as for example perpendicular, to said surface.

Various examples of parts which are susceptible to being obtained by means of said method include: space satellites, jet engine mounts, an unmanned aircraft wing, an automobile chassis, a motorcycle swing arm, a bicycle frame or a pedestrian footbridge, whether based on a single-element body or a body formed from joining various elements.

A third aspect of the present invention relates to a system for manufacturing a part made from composite material according to the method of the first aspect of the present invention. Said system is characterised in that it comprises:
- a manufacturing module adapted to obtain a body that includes in its interior at least one tubular cavity that extends between a first end and a second end opposite to said first end, wherein said first end is disposed on the outer surface of the body and comprises an inlet orifice; and
- a continuous fibre insertion module, adapted to introduce a continuous fibre bundle in the interior of said tubular cavity.

For one embodiment, the same continuous fibre insertion module is also adapted to introduce resin in the liquid state, being adapted to carry out both the introduction of the continuous fibre bundle and the resin in the liquid state in the interior of the tubular cavity simultaneously or sequentially.

For another embodiment, the system comprises an additional insertion module, adapted to introduce resin in the liquid state in the interior of the tubular cavity, thereby enabling the use of an insertion module for the insertion of the fibre bundles in the tubular cavities and another for the subsequent insertion of the resin in the liquid state therein. In this manner, the continuous fibre bundles could firstly be inserted in all the tubular cavities using the fibre insertion module and subsequently insert the resin in all the tubular cavities using the resin insertion module.

For an embodiment, the system also comprises a curing module adapted to cure the resin introduced in said tubular cavity of the body.

For an alternative embodiment, for which a resin cured at ambient temperature is inserted, said curing module is not necessary, due to which it is not included in the system proposed by the third aspect of the invention.

In accordance with an embodiment, the aforementioned continuous fibre insertion module is adapted to carry out the introduction of resin in the liquid state and of said continuous fibre bundle in the interior of said tubular cavity, simultaneously.

For one embodiment, the continuous fibre insertion module comprises:
- a receptacle susceptible of storing resin in the liquid state and configured to receive a continuous fibre bundle, said receptacle having an outlet opening for the resin and the continuous fibre bundle;
- an applicator element having a first end coupled to the outlet opening of the receptacle and a second end susceptible of being coupled to the inlet orifice of a tubular cavity of the at least one tubular cavity of the body obtained using the manufacturing module, said applicator element being adapted to allow the resin and continuous fibre bundle to access the interior of said tubular cavity from the receptacle; and
- a pressure actuator configured to apply a pressure gradient on the resin between the inlet orifice and the second end of said tubular cavity, the pressure in the inlet orifice being greater than the pressure in the second end.

In accordance with a variant of said embodiment, the aforementioned applicator element, and in general the entire insertion module, is adapted to allow the resin and the continuous fibre bundle to access the interior of the tubular cavity from the receptacle simultaneously.

For an alternative variant, the applicator element is adapted to allow the resin and continuous fibre bundle to access the interior of the tubular cavity from the receptacle sequentially, for example making pressurised air pass firstly in order to drag the fibres along the interior of the tubular cavity and then making the resin pass under pressure to be inserted in the tubular cavity and impregnate the fibres.

In one embodiment, said receptacle comprises a lid disposed on one end of the receptacle opposite to the end wherein the inlet opening is located. Optionally in said embodiment, the lid comprises an inlet opening configured to receive a continuous fibre bundle and guide it towards the interior of the receptacle. Preferably, said inlet opening is substantially aligned with the outlet opening of the receptacle when the lid is disposed on the receptacle.

The pressure actuator may be of the pneumatic or mechanical type, such as for example a manually or automatically actuated piston. Preferably, the pressure actuator exerts pressure on the free surface of the resin contained in the receptacle of the continuous fibre insertion module. More preferably, the pressure actuator is coupled to the receptacle.

Optionally, the continuous fibre insertion module comprises a second receptacle susceptible of storing a continuous fibre bundle, said second receptacle having a second outlet opening configured so that the continuous fibre bundle exits the second receptacle and is received in the receptacle susceptible of storing resin in the liquid state. Preferably, the second receptacle is connected to said receptacle susceptible to storing resin in the liquid state, both receptacles being subjected to the pressure exerted by the pressure actuator.

Also optionally, the second end of the applicator element comprises a nozzle with a point susceptible of being introduced in the interior of a tubular cavity. The nozzle acts by way of transition between the applicator element and the tubular cavity, facilitating the insertion of the resin and of the continuous fibre bundle.

In certain embodiments, the continuous fibre insertion module comprises two, three, four or more applicator elements, and the receptacle susceptible of storing resin in the liquid state comprises two, three, four or more outlet openings, each applicator element having a first end coupled to a different outlet opening of the receptacle, and of a second end susceptible of being coupled to the inlet orifice of a different tubular cavity. This enables the insertion of various continuous fibre bundles at the same time, reducing the time required to reinforce a part.

The continuous fibre insertion module constitutes another aspect of the present invention in itself. As such, this module may be used as part of the above-mentioned system or in other systems wherein it is necessary to introduce, simultaneously or sequentially, resin in the liquid state and a continuous fibre bundle in the interior of a tubular cavity. In the case of the sequential introduction, it is preferable to use two insertion modules (identical or different therebetween), one for the insertion of the fibre bundles in the tubular cavities and the other for the subsequent insertion of the resin in the liquid state.

BRIEF DESCRIPTION OF THE DRAWINGS

In order to better understand the foregoing, a set of drawings is attached which, schematically and solely by way of non-limiting example, represent a practical cases of embodiments.

DESCRIPTION OF A PREFERRED EMBODIMENT

Figure 1:
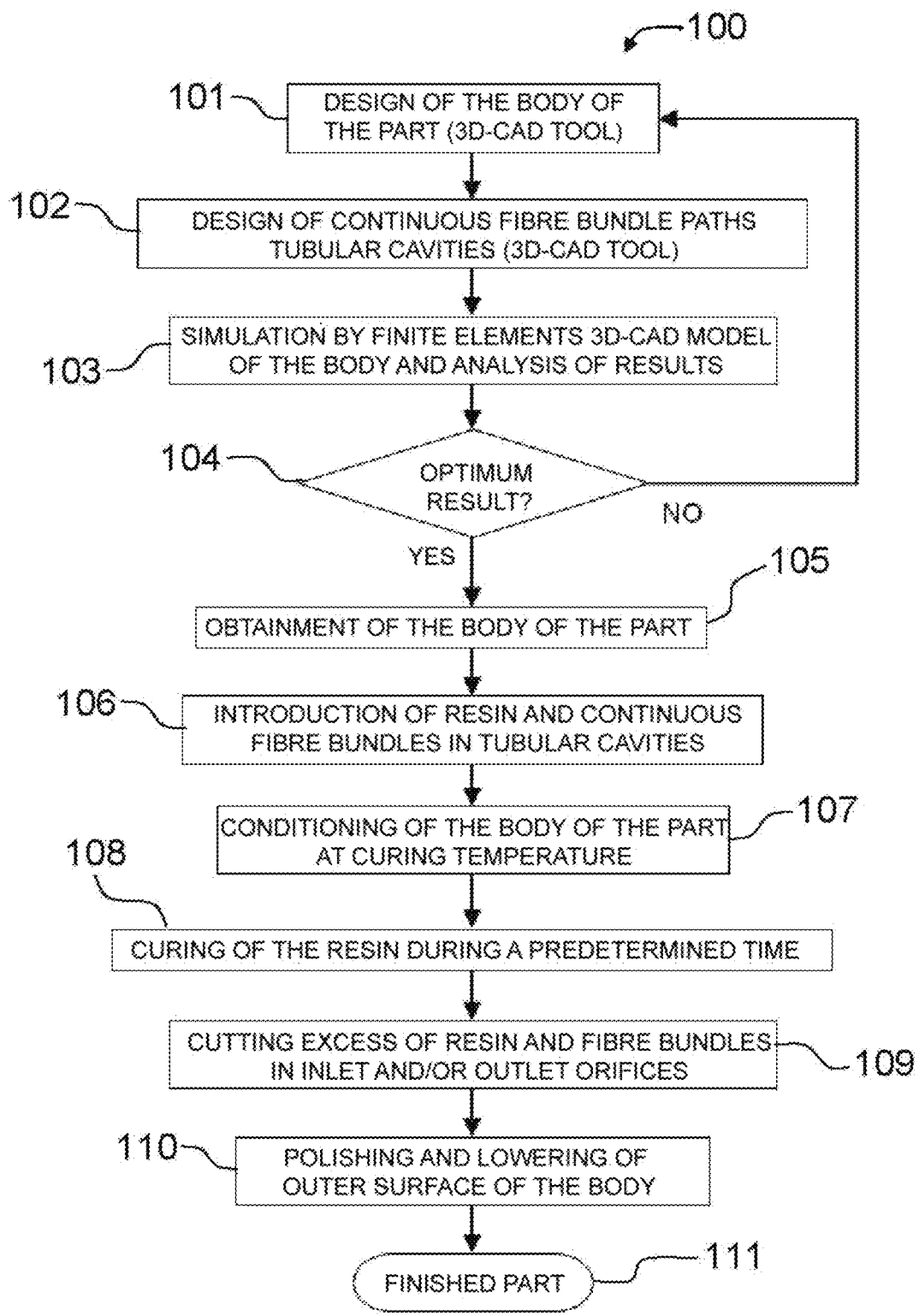
FIG. 1 shows the flow chart of a method for manufacturing a part made from composite material according to an embodiment of the present invention.

FIG. 1 represents the flow chart of an embodiment of the method for manufacturing a part made from the composite material of the present invention, wherein the part comprises a body and one or more continuous fibre bundles disposed in its interior. In particular, the method 100 comprises a first stage of designing 101 the body of the part using a three-dimensional CAD design tools based on a set of specifications (mechanical, thermal and/or chemical, inter alia) that the part must fulfil. Next, using the 3D-CAD model of the body, the paths that must be followed by one or more continuous fibre bundles (and, correspondingly, one or more tubular cavities) with which the body of the part will be reinforced are determined 102.

The method 100 also includes a simulation stage 103 performed with calculation algorithms that uses finite elements of the 3D-CAD model of the body of the part reinforced with continuous fibre bundles. In this stage it is possible to simulate the features and performance of the part in accordance with the type of material selected for the body, for the fibre bundles and for the resin, and for different contour and/or load conditions.

The analysis of the results obtained during the simulation stage 103 serves to determine 104 whether or not the reinforced part fulfils the design specifications. If this is not the case, it would be necessary to return to the initial design stage 101 of the body of the part to redefine its geometry, as well as the number of continuous fibre bundles required in said body and their paths.

However, if the 3D-CAD model of the body of the part reinforced with continuous fibre bundles fulfils the design specifications, it is proceed to perform the obtainment stage 105 for obtaining the body of the part. Said body comprises in its interior one or more tubular cavities that extend between a first end, disposed on the outer surface of the body and which comprises an inlet orifice, and a second end, opposite to said first end.

Immediately thereafter, resin in the liquid state and a continuous fibre bundle are simultaneously introduced 106 in the interior of at least one tubular cavity of said one or more tubular cavities through its inlet orifice, such that the input end of the continuous fibre bundle advances towards the second end of said at least one tubular cavity. In this stage, overpressure can be applied to the resin in the inlet orifice of the tubular cavity wherein the continuous fibre bundle and/or an underpressure on the resin in the second end of said tubular cavity, if endowed with an outlet orifice. It is also possible to exert a mechanical pushing force (and/or, optionally, a torsion force) on the continuous fibre bundle to aid the introduction thereof in the tubular cavity.

Upon finalising the insertion of the continuous fibre bundles, the body of the part is conditioned 107 at the resin curing temperature and the resin is cured 108 until it solidifies and adheres to the body of the part, fixing the continuous fibre bundle in the interior of said at least one tubular cavity.

The method 100 also comprises a stage of cutting 109 any excess of continuous fibre bundle and/or resin that projects from the inlet and/or outlet orifice of said at least one tubular cavity and the stage of polishing and/or lowering 110 the outer surface of the body to improve the final appearance of the finished part 111.

Figure 2:
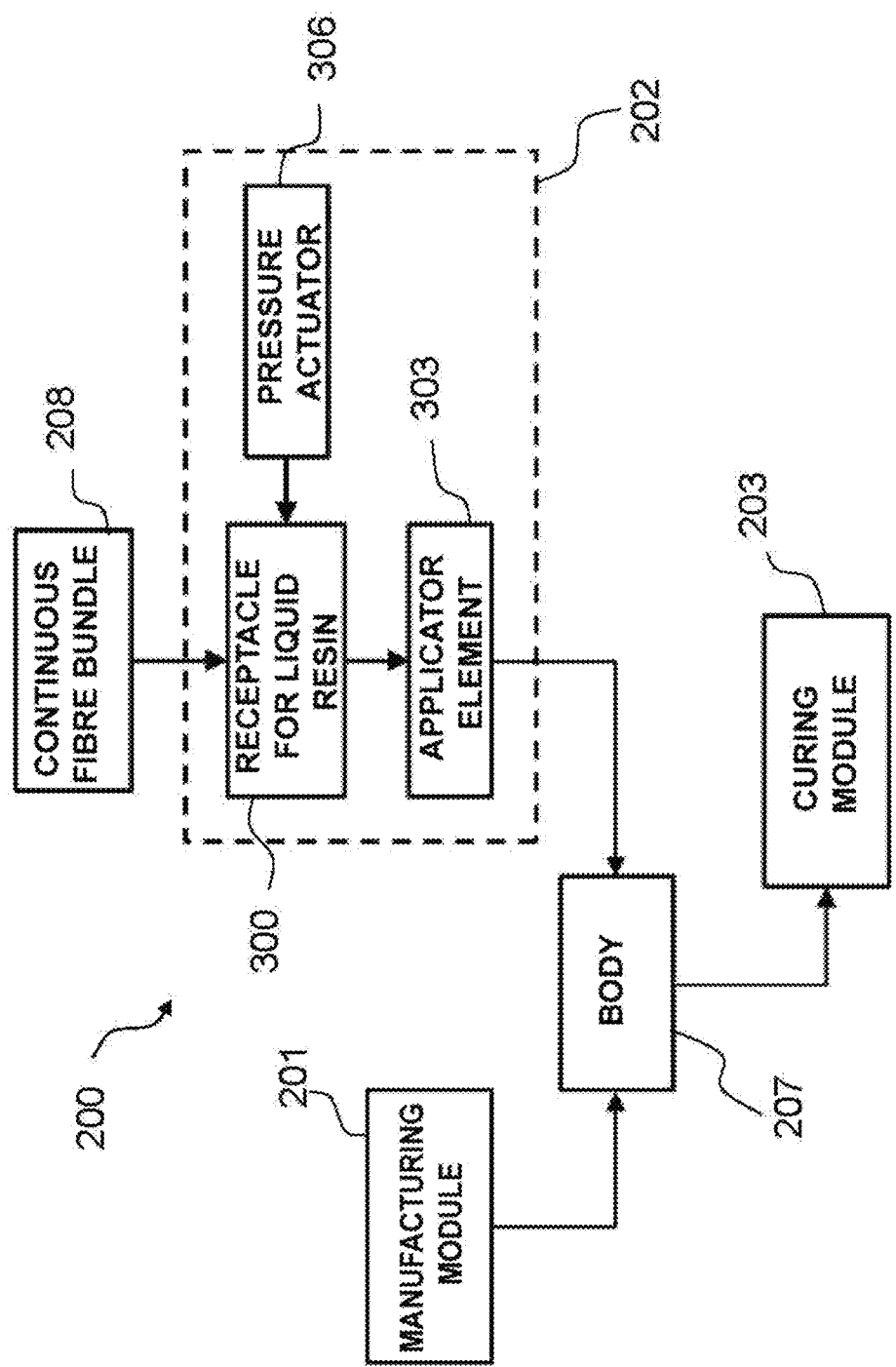
FIG. 2 shows a block diagram of a system for manufacturing a part made from composite material according to the method of the present invention.

FIG. 2 shows the block diagram of a system for manufacturing a part made from composite material according to the method of the present invention. The system 200 comprises a manufacturing module 201 adapted to obtain a body 207 that includes in its interior at least one tubular cavity that extends between a first end and a second end opposite to said first end. Said first end is disposed on the outer surface of the body and comprises an inlet orifice. The system 200 also comprises a continuous fibre insertion module 202 (which can proceed from a coil or be pre-cut to a certain length, adapted to simultaneously introduce resin in the liquid state and a continuous fibre bundle 208 in the interior of said tubular cavity of the body 207, and a curing module 203 wherein, in general, the body 207 is introduced and which is adapted to cure the resin introduced in said tubular cavity of the body 207.

Figure 3:
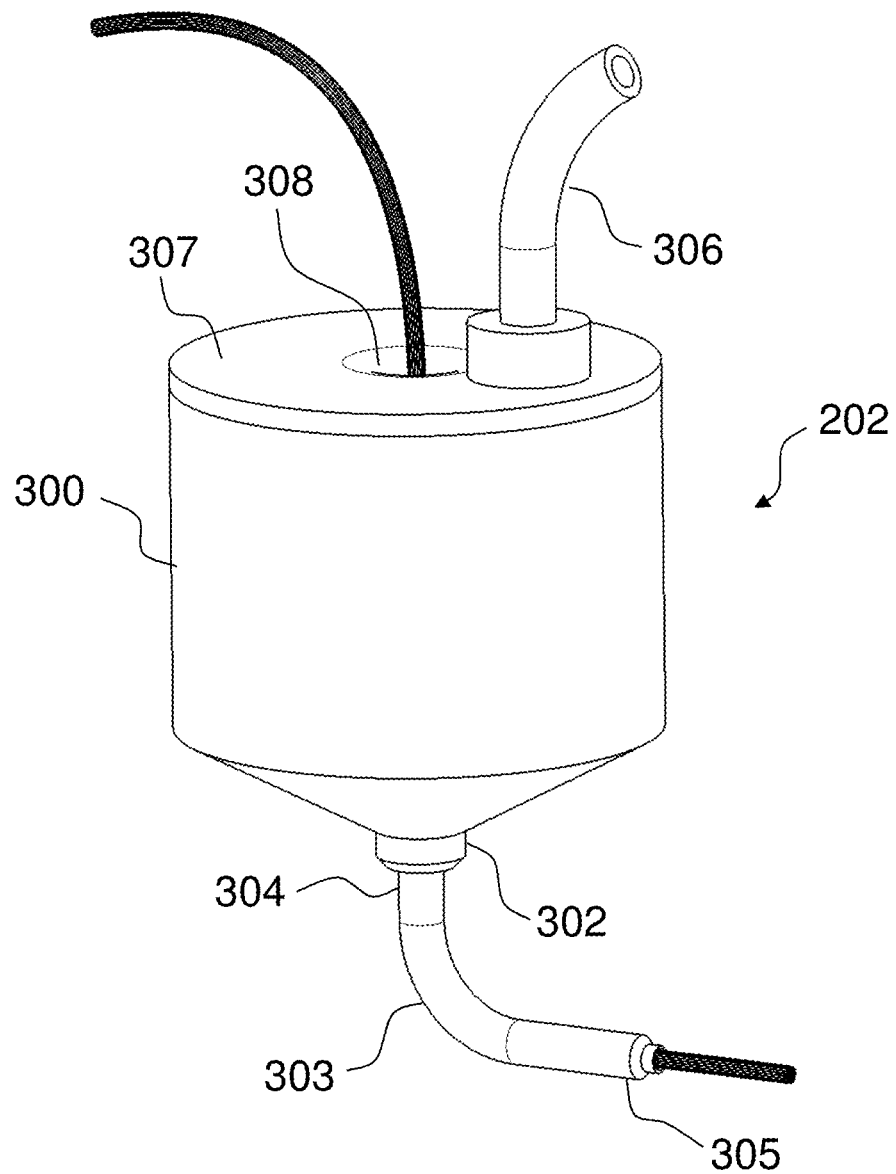
FIG. 3 shows, in a perspective view, an embodiment of the continuous fibre insertion module of the system of FIG. 2.
Figure 4:
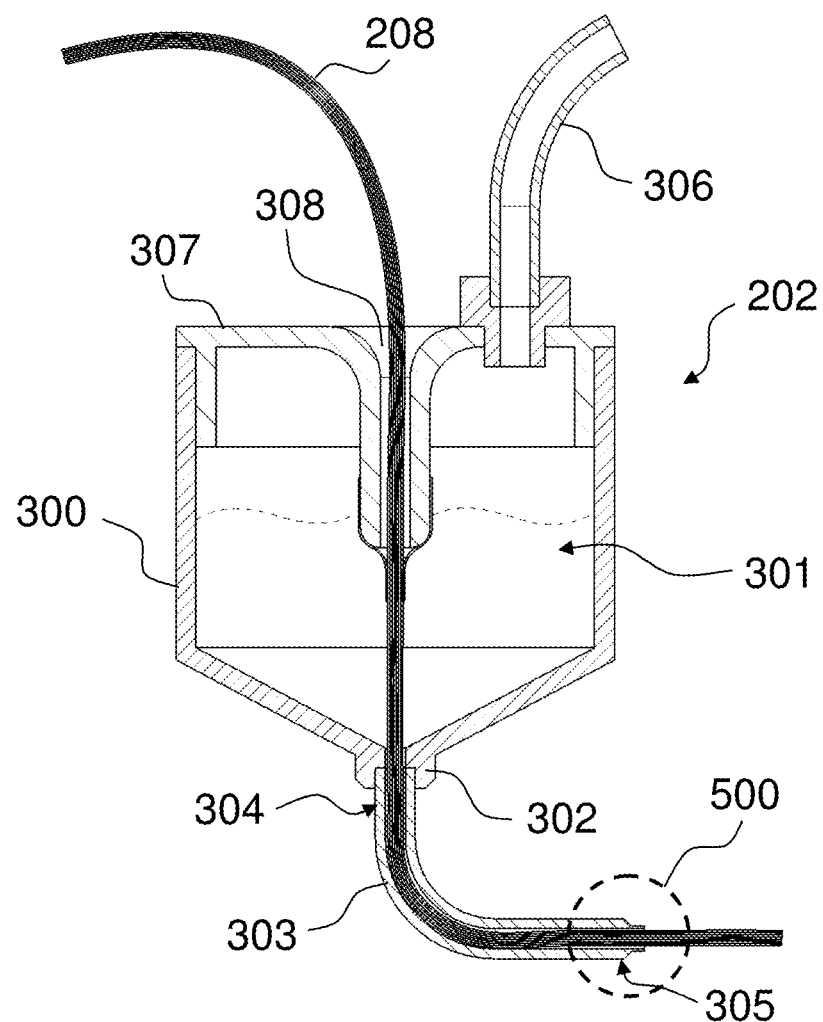
FIG. 4 shows a cross-section of the continuous fibre insertion module of FIG. 3.

FIGS. 3 and 4 show, respectively, a perspective view and a cross-section of an embodiment of the continuous fibre insertion module 202. As can be observed in the figures, said module 202 comprises a receptacle 300 susceptible of storing resin 301 in the liquid state and configured to receive a continuous fibre bundle 208. The receptacle 300 has an outlet opening 302 for the resin 301 and the continuous fibre bundle 208. The receptacle 300 comprises a lid 307 disposed at one end of the receptacle opposite to the end wherein the inlet opening is disposed 302. Also, the receptacle 300 comprises an inlet opening 308 disposed on the lid 307, which is substantially aligned with the outlet opening 302 of the recipient when the lid 307 is disposed on the receptacle 300. The inlet opening 308 is configured to receive a continuous fibre bundle 208 and guide it towards the interior of the receptacle 300.

The continuous fibre insertion module 202 also includes an applicator element 303 having a first end 304 coupled to the outlet opening 302 of the receptacle and a second end 305 susceptible of being coupled to the inlet orifice of a tubular cavity of the at least one tubular cavity of the body 207, previously obtained by means of the manufacturing module 201. The applicator element 303 is adapted to enable the resin 301 and the continuous fibre bundle 208 to simultaneously access the interior of said tubular cavity from the receptacle 300.

Figure 5:
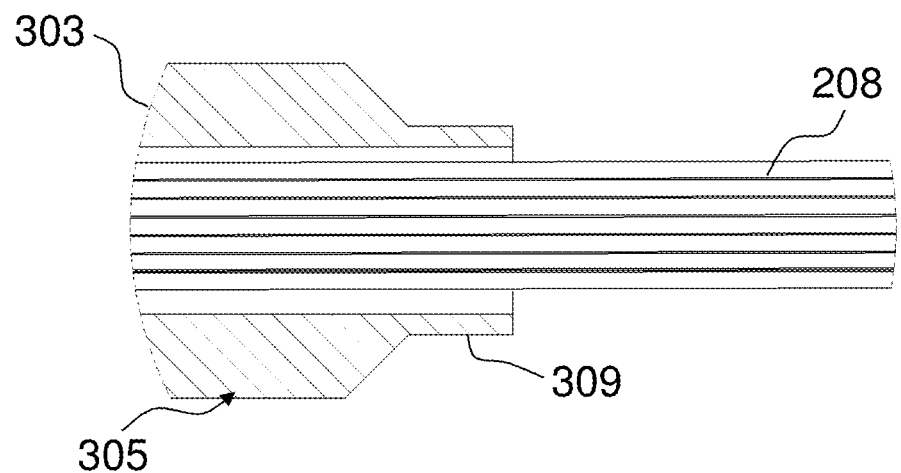
FIG. 5 shows an expanded view of the zone of FIG. 4 corresponding to the end of the applicator element of the continuous fibre insertion module susceptible of being coupled to the inlet orifice of a tubular cavity.

FIG. 5 provides an expanded view of the part of the applicator element 303 next to a second end 305 arranged within the circumference 500 in FIG. 4. As can be observed in FIG. 5, the applicator element 303 comprises at its second end 305 a narrowing 309 in the manner of a transition, facilitating the insertion of the second end 305 in the inlet orifice of the tubular cavity.

Additionally, the continuous fibre insertion module 202 comprises a pressure actuator 306 configured to apply a pressure gradient on the resin 301 between the inlet orifice and the second end of said tubular cavity, wherein the pressure on the inlet orifice is greater than the pressure on the second end.

The pressure actuator 306 is of the pneumatic type and is coupled to the lid 307 of the receptacle 300. Said actuator 306 enables the introduction of compressed air in the interior of the receptacle 300, exerting pressure on the free surface of the resin 301 contained in the receptacle 300.

Example 1

Figure 6A:
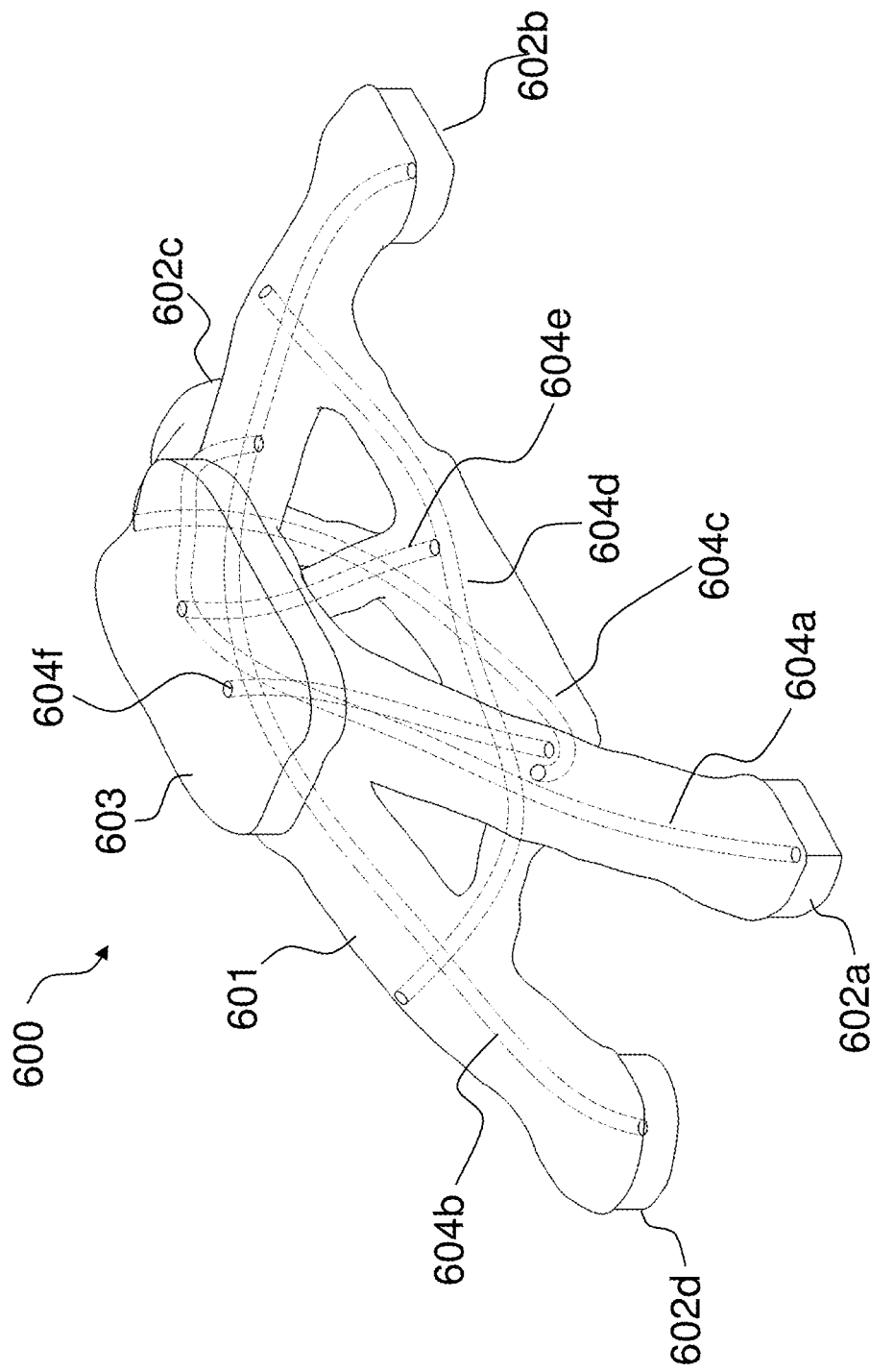
FIGS. 6a-c show, respectively, a profile and front perspective view of a part made from composite material manufactured using the method of the present invention.
Figure 6B:
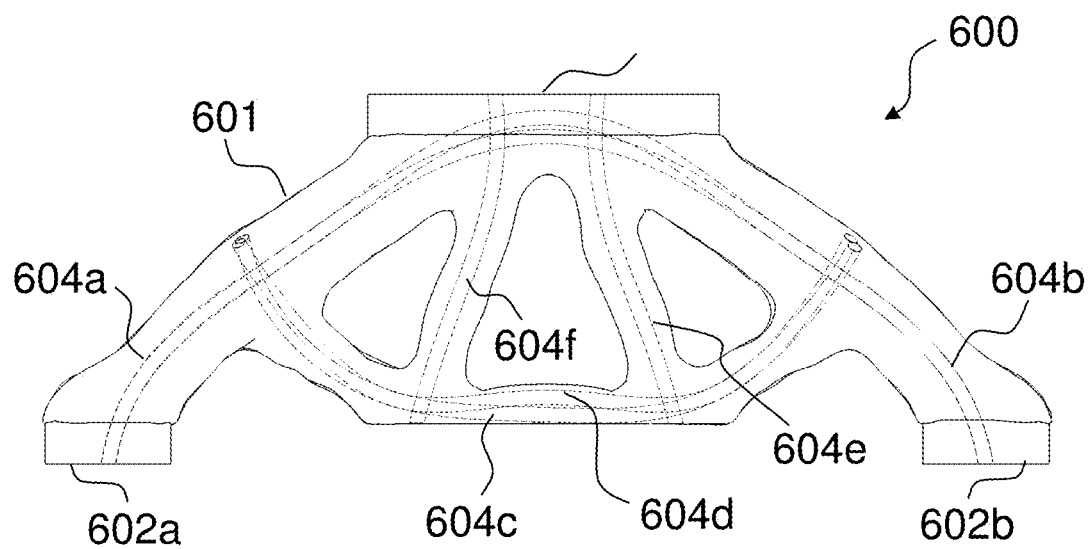
Figure 6C:
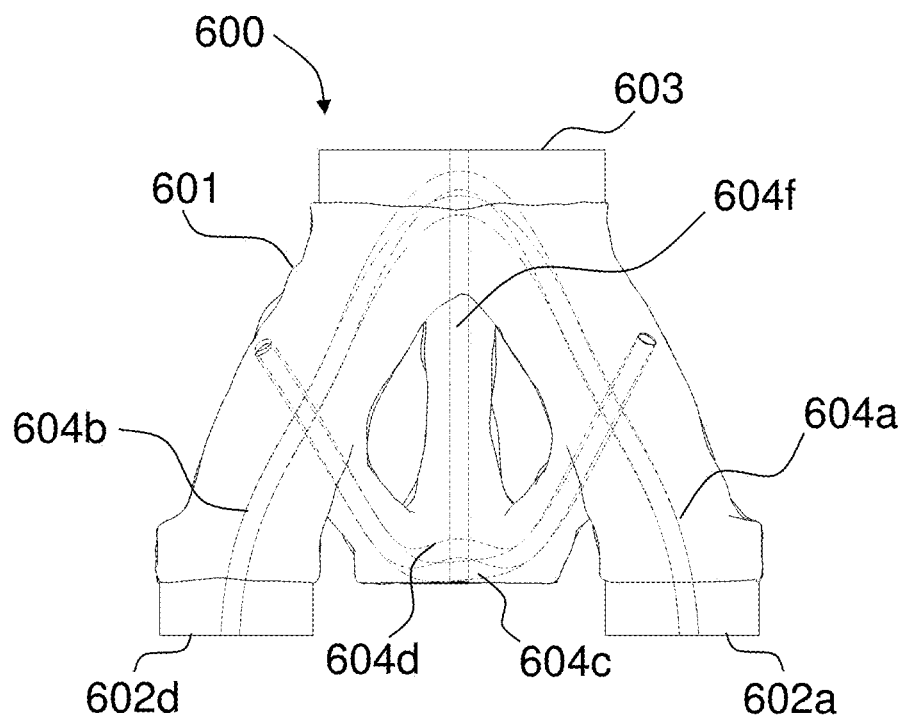

FIGS. 6a-c show, respectively, a profile and front perspective view of an example of a part made from composite material manufactured using the method of the present invention. Specifically, the part 600 comprises a body 601 having four support zones 602a-d on its lower part and a load zone 603 on its upper part. The part 600 has been designed to support a force exerted on the load zone 603 and aimed vertically towards the plane whereon the four support zones 602a-d rest. In particular, the dimensions of the part 600 are 175 mm×80 mm×65 mm.

The shape of the body 601 has been calculated using topology optimisation tools based on the finite element method to automatically optimise the geometry of the body 601, removing material from those zones subject to less mechanical stress. Upon optimising the geometry of the body 601, the path of the continuous fibre bundles has been determined (and, correspondingly, of the tubular cavities that will house them) through the interior of the body 601 of the part using 3D-CAD tools.

The body 601 of the part 600 is made from polylactic acid (PLA) and has been obtained by means of FDM-type additive manufacturing technology, wherein the body 601 comprises a plurality of layers, stacked in a direction perpendicular to the plane whereon the four support zones 602a-d rest. In its interior, the body 601 includes six passthrough tubular cavities 604a-f, each comprising one inlet orifice and one outlet orifice disposed on the outer surface of the body 601, and with trajectories that penetrate more than one layer of the body 601. The tubular cavities 604a-f have a circular cross-section, approximately 2 mm in diameter, which is maintained substantially constant throughout the tubular cavity. Also, the length of the tubular cavities 604a-f is at least 20 times greater than the diameter of its cross-section.

In order to reinforce the body 601, continuous 2400 tex glass fibre bundles (marketed by R&G) are used. The ends of the continuous fibres that form said bundles have been joined therebetween by means of a joining element (specifically a thread of approximately 0.1 mm in diameter) to prevent the fibres of said bundles from becoming separated as their input ends advance through the interior of the tubular cavities 604a-f and intertwine with the walls thereof, as FDM additive manufacturing technology produces considerable superficial roughness.

In turn, the resin used is of the dual-component epoxy type (in particular, Epoxy Resin L and GL2 Hardener, also marketed by R&G). This resin has a density of 1.15 g/cm³ and a mixture viscosity of 250 mPa·s at a temperature of 25° C.

The weight of the continuous fibres and the diameter of the tubular cavity determine the percentage of continuous fibres and resin that will remain in the interior of the tubular cavity after inserting the fibre bundle. The weight of the fibres is measured preferably in tex units, which is equivalent to grammes per kilometre. Therefore, inserting a continuous 2400 tex glass fibre bundle in a tubular cavity of approximately 2 mm in diameter is equivalent to a volumetric concentration of continuous fibres in the tubular cavities of approximately 30%.

On introducing the continuous fibre bundles in the tubular cavities of the body of the part, it must be taken into account that the injection pressure and viscosity of the resin, together with the diameter of the tubular cavity and the type and weight of the continuous fibres, determine the average resin injection speed and the maximum travel of the continuous fibre bundle. Therefore, for a certain viscosity of the resin, diameter of the tubular cavity, and type and weight of the continuous fibres, the higher the injection pressure the higher the average injection speed and the greater the maximum travel of the continuous fibre bundle. Alternatively, if the injection pressure, the diameter of the tubular cavity and the type and weight of the continuous fibres are fixed, the greater the viscosity of the resin the lower the average injection speed and the shorter the maximum travel of the continuous fibre bundles.

In this example, in order to reinforce the part 600 a continuous fibre bundle has been introduced in each of the six tubular cavities 604a-f of the body 601, by applying a positive pressure between 2 and 3 bar in the inlet orifice of each of said tubular cavities 604a-f.

Upon concluding the stage of insertion of resin in the liquid state and of the continuous fibre bundles, the curing of the resin at ambient temperature (25° C.) has been performed for a period of 48 hours to allow the resin to solidify, fixing said bundles in the interior of the tubular cavities 604a-f.

Lastly, upon curing the resin, the excess of the continuous fibre bundle and resin that projected from the inlet and outlet orifice of each tubular cavity 604a-f, giving the part 600 its definitive finish.

Therefore, the part 600 made from composite material comprises a body 601 that comprises a plurality of layers stacked in a direction perpendicular to the surface thereof and six continuous fibre bundles disposed in the tubular cavities 604a-f in the interior of the body 601. Each of the six continuous fibre bundles has on its lateral surface a coating of resin of a material different to that of the material of the body 601. In addition, each continuous fibre bundle is contained in two or more layers of the plurality of layers of the body 601.

In order to verify that the part 600 made from composite material reinforced with continuous fibre bundles has better mechanical features, a non-reinforced part has also been manufactured, the body of which has the same geometry as the body 601 but without tubular cavities in its interior. In order to obtain the body of the non-reinforced part, the same additive manufacturing technology, machinery and configuration as those used to obtain the body 601 have been used.

Mechanical testing has been conducted on both parts using a universal testing machine. Each part has been placed on a rigid platform of said machine on its four support zones and a force applied to the load zone of each part, aimed vertically towards the plane of the rigid platform on which the four support zones rest.

The following table shows the results obtained for each of the parts. As can be observed, the part 600 made from composite material reinforced with glass fibre has greater resistance, both in absolute terms and in relation to its mass (or specific resistance). In fact, the resistance to the part 600 is 80% greater than that of the non-reinforced part, the weight of the former being only 20% greater than that of the latter, resulting in a specific resistance 50% greater.

|  | Part without reinforcement | Part with reinforcement | Increment [%] |
| --- | --- | --- | --- |
| Resistance [kN] | 3.1 | 5.6 | 80.8 |
| Part Weight [g] | 94.0 | 113.0 | 20.2 |
| Specific resistance [N/g] | 33.0 | 49.6 | 50.4 |

Figure 7:
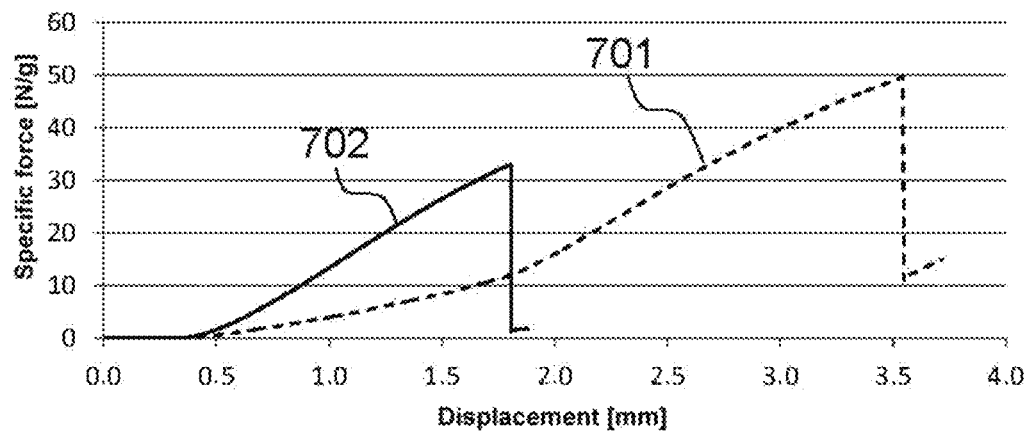
FIG. 7 shows a comparative of the characteristic specific force-displacement curve of the part made from composite material of FIGS. 6a-c reinforced with continuous fibre bundles and of the same part without reinforcement.

FIG. 7 shows the characteristics specific force-displacement curves of the part made from composite material reinforced with glass fibre and the part without reinforcement. As the force increases (and with it the specific force) applied to the load zone of the part, the part is progressively flexed, thereby increasing the displacement of the load zone towards the rigid platform whereon the part rests, until producing the rupture of the part, moment in which the specific force drops abruptly. Therefore, in the characteristic curve 701 (corresponding to the part 600 made from composite material with glass fibre reinforcement) of FIG. 7 the rupture occurs for a specific force greater than in the characteristic curve 702 (corresponding to the part without reinforcement).

On modifying this Example 1, by designing more tubular cavities and inserting more fibre bundles in the interior of the body, greater increments than those indicated in the above table are achieved.

Example 2

Figure 8:
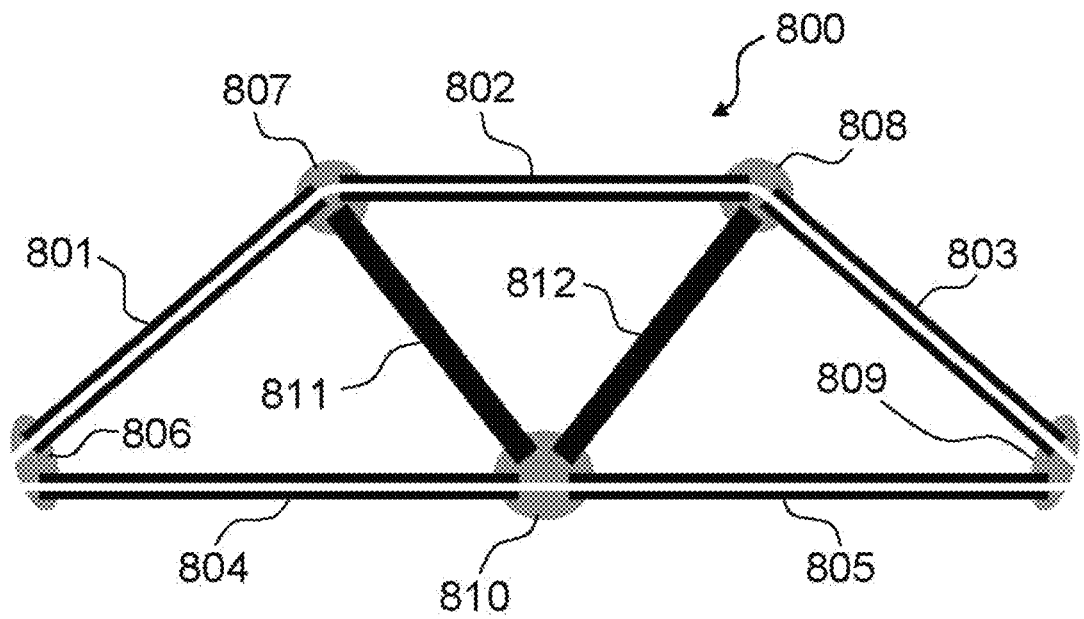
FIG. 8 shows a schematic example of a part whose body has been obtained by means of the union of a plurality of elements.

FIG. 8 shows a second example of a part made from composite material whose body has been obtained by joining a plurality of elements. In particular, the body 800 of the part comprises a plurality of elements 801-810, each element having at least one tubular cavity segment in its interior. FIG. 8 shows a cross-section of the body 800 in order to be able to observe the tubular cavity segments disposed in elements 801-810.

As can be observed in the figure, not all the elements 801-810 have the same shape and/or dimensions. Therefore, while the elements 801-805 are substantially cylindrical and elongated, the elements 806-810 are substantially spherical or ellipsoidal and act as joining elements of the former. Also, each of the elements 806 and 809 contain two independent tubular cavity segments in their interior, while each of the elements 801-805, 807, 808 and 810 include only one in their interior.

In accordance with the method of the present invention, the elements 801-810 have been joined together to obtain the body 800, interconnecting the tubular cavity segments contained therein such as to form a first through tubular cavity arranged within elements 806, 801, 807, 802, 808, 803 and 809, and a second through tubular cavity arranged within elements 806, 804, 810, 805 and 809.

The body 800 also comprises a second plurality of elements, formed by elements 811 and 812, which do not contain any tubular cavity segment in their interior. Specifically, the element 811 is joined to elements 807 and 810, while element 812 is joined to elements 808 and 810.

Figure 9A:
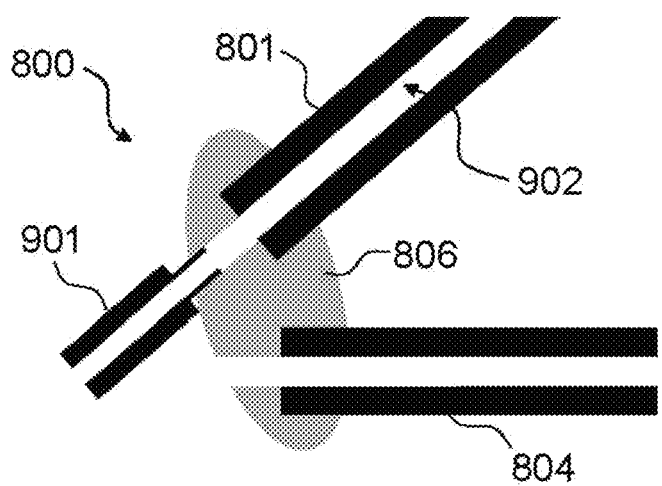
FIGS. 9a-c represent, in three different instants, the insertion of a continuous fibre bundle in a tubular cavity of the body of the part of FIG. 8.
Figure 9B:
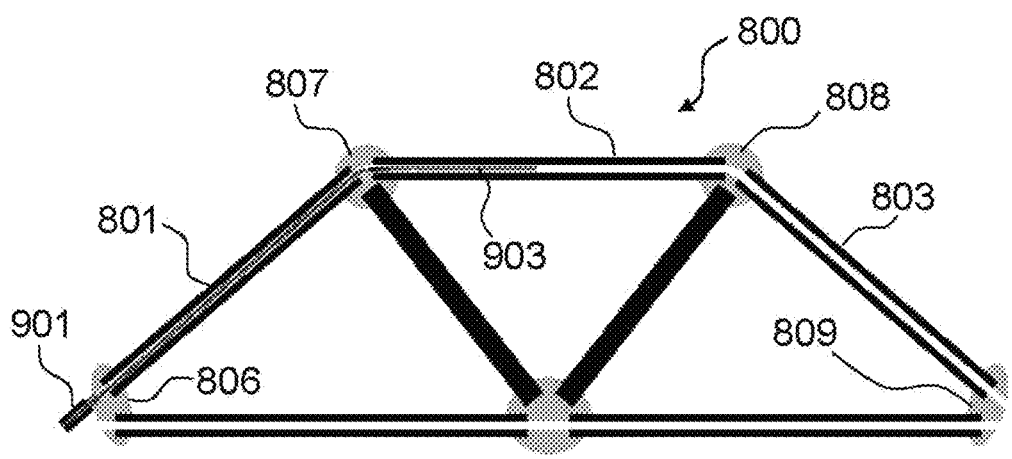
Figure 9C:
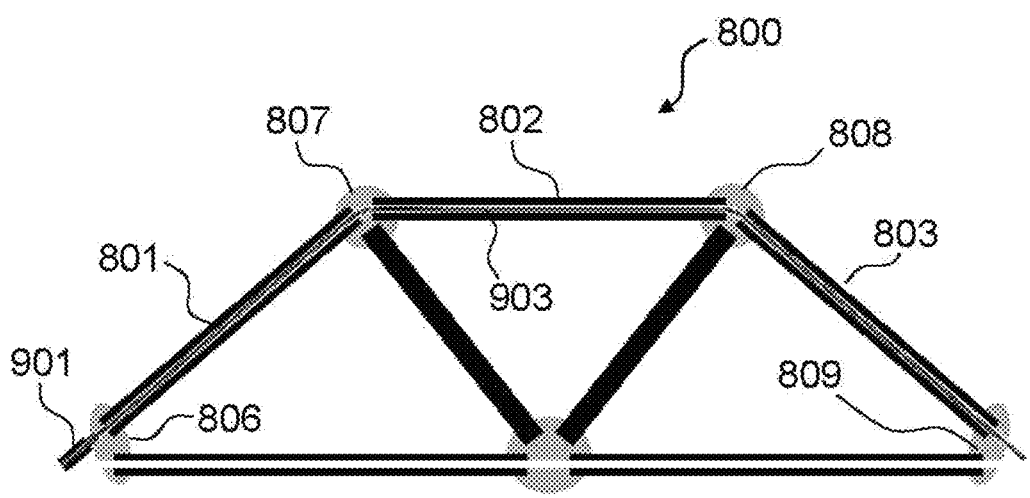

FIGS. 9a-c show three different instants of the insertion of a continuous fibre bundle in a tubular cavity of the body of the part of FIG. 8. FIG. 9a provides a detailed view of a portion of the body 800, wherein elements 801, 804 and 806 can be observed joined therebetween. The figure also shows elements 801, 804 and 806 joined therebetween. The figure also shows the end of an applicator element 901 coupled to the inlet orifice of the passthrough first tubular cavity 902 of the body 800, ready to initiate the simultaneous introduction of resin in the liquid state and a continuous fibre bundle in the interior of said tubular cavity 902.

FIGS. 9b and 9c show the continuous fibre bundle 903 advancing along the interior of the first tubular cavity 902, passing from one tubular cavity segment to the next. In FIG. 9b the input end of the continuous fibre bundle 903 is approximately halfway along the length of the first tubular cavity 902, while in FIG. 9c said input end has already reached the outlet orifice of the first tubular cavity 902.

Despite the fact that reference has been made to specific embodiments of the invention, it is evident for a person skilled in the art that the described method and system for manufacturing a part made from composite material, and the part made from composite material obtained by means of said method, are susceptible of many variations and modifications, and that all the aforementioned details may be replaced by other, technically equivalent ones, without detracting from the scope of protection defined by the attached claims.

The invention claimed is:

1. A method for manufacturing a part made from composite material, wherein the part comprises a body and one or more continuous fiber bundles arranged within said body, wherein the method comprises the stages of:
   a) obtaining a said body, which includes one or more tubular cavities in its interior, wherein each tubular cavity of said one or more tubular cavities extends between a first end, disposed on the outer surface of the body and which comprises an inlet orifice, and a second end, opposite to said first end;
   b) introducing resin in the liquid state and a continuous fiber bundle in the interior of at least one tubular cavity of said one or more tubular cavities through its inlet orifice, such that the input end of the continuous fiber bundle advances towards the second end of said at least one tubular cavity; and
   c) curing the resin until it solidifies, adhering to the body of the part and fixing the continuous fiber bundle in the interior of said at least one tubular cavity;
   wherein stage b) comprises carrying out said introduction of resin in the liquid state and of said continuous fiber bundle simultaneously, performing said introduction of the continuous fiber bundle within said at least one tubular cavity exerting on the continuous fiber bundle a viscous drag force by means of the resin, applying pressure differential.

2. The method, according to claim 1, wherein said at least one tubular cavity has curved sections.

3. The method, according to claim 2, wherein said at least one tubular cavity are several tubular cavities running within said body unparallelly with respect to each other.

4. The method, according to claim 1, wherein in stage b) a positive pressure is exerted on the resin in the inlet orifice of a tubular cavity of said at least one tubular cavity, such that the resin introduced in said tubular cavity is impelled towards the second end of said tubular cavity.

5. The method, according to claim 1, wherein the second end of a tubular cavity of said at least one tubular cavity is disposed on the outer surface of the body and comprises an outlet orifice; and wherein in stage b) a vacuum is applied in the outlet orifice of said tubular cavity, such that the resin introduced in said tubular cavity is suctioned towards its outlet orifice.

6. The method, according to claim 1, wherein after stage c) the method comprises the additional stages of:
cutting any excess of the continuous fibre bundle and/or resin that project from the inlet orifice of said at least one tubular cavity; and/or
polishing and/or lowering the outer surface of the body.

7. The method, according to claim 1, wherein before stage c) the method comprises a stage of conditioning the body of the part at resin curing temperature.

8. The method, according to claim 7, wherein the stage of conditioning the body of the part is performed between stage a) and stage b).

9. The method, according to claim 1, wherein stage a) uses additive manufacturing technology.

10. The method, according to claim 1, wherein prior to stage a) the method comprises the stages of:
creating a three-dimensional model of the body of the part to be manufactured; and
determining the path of each tubular cavity of said one or more tubular cavities based on said three-dimensional model.

11. The method, according to claim 1, wherein the body of the part comprises a plurality of elements, each element having in its interior at least one segment of tubular cavity; and wherein stage a) comprises the substage of joining the plurality of elements there between, interconnecting the tubular cavity segments such as to form said one or more tubular cavities.

12. The method, according to claim 1, wherein prior to stage b) the method comprises the additional stages of:
applying a bath of liquid resin to the continuous fiber bundle; and
confronting the input end of the resin-impregnated continuous fiber bundle with the inlet orifice of said at least one tubular cavity.

13. The method, according to claim 1, wherein prior to stage b) the method comprises the stage of coupling a joining element to the input end of the continuous fiber bundle configured to join the ends of the continuous fibers that form said bundle.

14. The method, according to claim 13, wherein the joining element has a geometry adapted to tightly fit in the interior of the cross-section of the tubular cavity wherein the continuous fiber bundle having said joining element will be introduced.

15. The method, according to claim 1, which comprises:
a stage of emptying existing powder from inside the tubular cavity prior to inserting the continuous fiber bundle in the tubular cavity, and/or
a stage of applying a treatment in the interior of the tubular cavity to reduce its roughness prior to inserting the continuous fiber bundle.

16. A method for manufacturing a part made from composite material, wherein the part comprises a body and one or more continuous fiber bundles arranged within said body, wherein the method comprises the stages of:
a) obtaining said body, which includes one or more tubular cavities in its interior, wherein each tubular cavity of said one or more tubular cavities extends between a first end, disposed on the outer surface of the body and which comprises an inlet orifice, and a second end, opposite to said first end;
b) introducing resin in the liquid state and a continuous fiber bundle in the interior of at least one tubular cavity of said one or more tubular cavities through its inlet orifice, such that the input end of the continuous fiber bundle advances towards the second end of said at least one tubular cavity; and
c) curing the resin until it solidifies, adhering to the body of the part and fixing the continuous fiber bundle in the interior of said at least one tubular cavity;
wherein stage b) comprises carrying out said introduction sequentially, first for the continuous fiber bundle and subsequently for the resin in the liquid state, performing said introduction of the continuous fiber bundle within said at least one tubular cavity:
exerting a dragging force by means of a pressurized fluid along the interior of at least said tubular cavity and/or
exerting a mechanical pushing force on the bundle of continuous fibers.

17. The method, according to claim 16, wherein said pressurized fluid is air or another gas.

18. The method, according to claim 16, wherein said at least one tubular cavity has curved sections.

19. The method, according to claim 18, wherein said at least one tubular cavity are several tubular cavities running within said body unparallelly with respect to each other.

* * * * *